US006586862B1

United States Patent
Cselle

(10) Patent No.: US 6,586,862 B1
(45) Date of Patent: Jul. 1, 2003

(54) PIEZOELECTRIC ADJUSTING MECHANISM

(75) Inventor: Tibor Cselle, Sigmaringen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 09/926,315

(22) PCT Filed: Apr. 13, 2000

(86) PCT No.: PCT/EP00/03344

§ 371 (c)(1),
(2), (4) Date: Jan. 7, 2002

(87) PCT Pub. No.: WO00/62962

PCT Pub. Date: Oct. 26, 2000

(30) Foreign Application Priority Data

Apr. 14, 1999 (DE) .......................... 199 25 193

(51) Int. Cl.⁷ .............................................. H01L 41/08
(52) U.S. Cl. ...................................................... 310/328
(58) Field of Search ............................ 310/323.01, 328

(56) References Cited

U.S. PATENT DOCUMENTS 3,434,375 A    3/1969  Clashausen
3,957,162 A *  5/1976  Soderqvist ................... 214/1 R
4,168,577 A *  9/1979  Soderkqvist .............. 33/180 R
4,769,569 A *  9/1988  Stahlhuth .................... 310/328
5,821,671 A * 10/1998  Trzmiel ....................... 310/328

FOREIGN PATENT DOCUMENTS

FR        2 664 201        1/1992

* cited by examiner

Primary Examiner—Mark O. Budd
(74) Attorney, Agent, or Firm—Oblon, Spivak, McClelland, Maier & Neustadt, P.C.

(57) ABSTRACT

A piezoelectric adjusting mechanism includes a piezoelectric displacing element that is placed in contact with a cutting element and that is provided for displacing the cutting element with regard to a tool shaft. The mechanism also includes a holding mechanism for holding the first displacing element in a determined deformation state. The piezoelectric adjusting mechanism can be used, in particular, for a fine boring tool in order to adjust cutting elements, the elements being arranged on the outer periphery of the fine boring tool, in a radial direction of the fine boring tool.

21 Claims, 2 Drawing Sheets

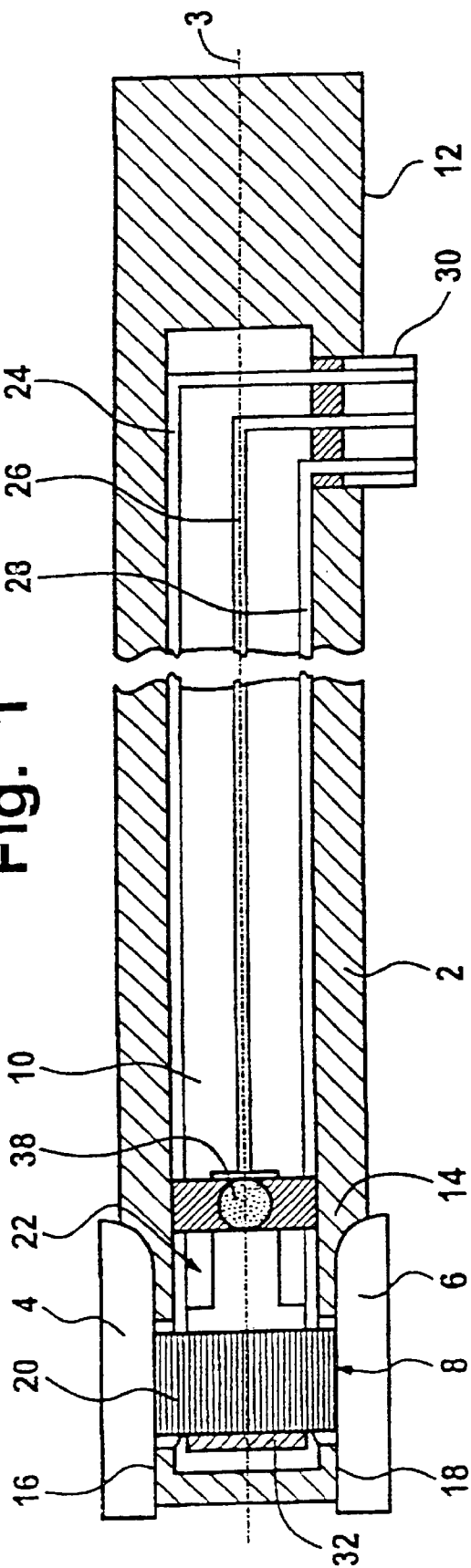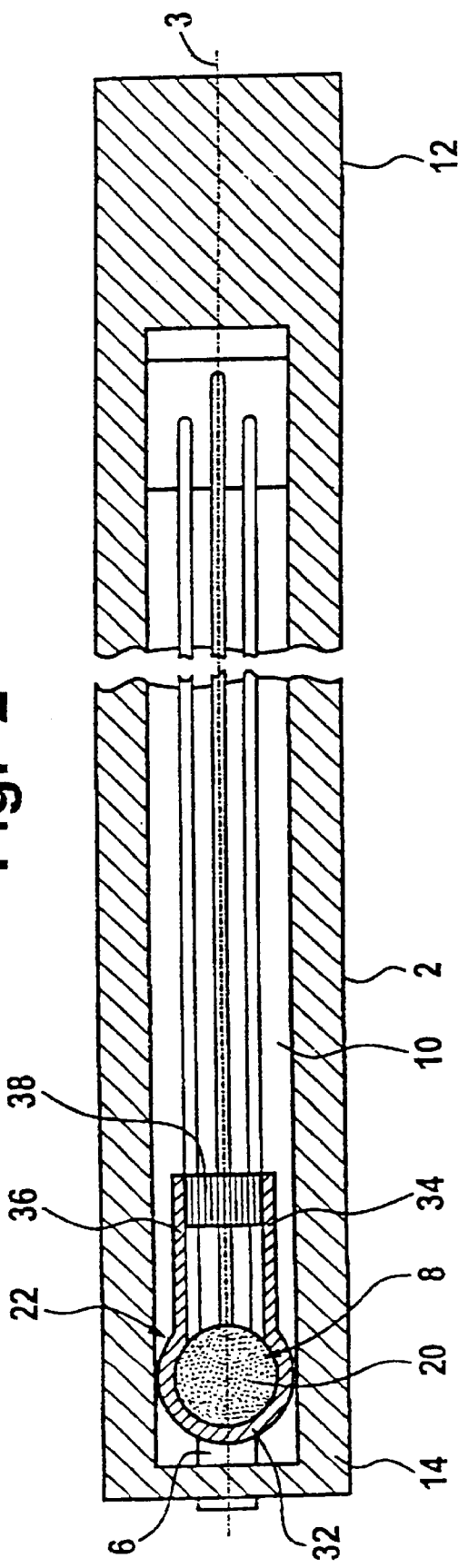

PIEZOELECTRIC ADJUSTING MECHANISM

The present invention relates to a piezoelectric adjusting mechanism for positioning a cutting element of a tool according to the preamble of claim 1 and to tools with such a piezoelectric adjusting mechanism according to the preambles of claims 6 and 9.

Piezoelectric crystals are known to have high inherent stiffness, are commercially available and, moreover, are extremely robust. They are therefore used in electromechanical systems for adjustment of the tool cutting edges. A tool with such a piezoelectric system for adjusting the tool cutting edge does not need any sensitive mechanical miniature components such as small setscrews, which require particular manual dexterity of the person who adjusts the tool. Instead, the adjustment can be achieved by means of a simple digital keyboard.

As examples, German Unexamined Application DE 3509240 describes a piezoelectric adjusting mechanism according to the preamble of claim 1 and a tool with such an adjusting mechanism according to the preamble of claim 6. DE 3509240 relates in particular to a drive device which contains at least one piezoelectric crystal. This piezoelectric crystal is braced on one side against an abutment provided on a machine tool. On the other side of the piezoelectric crystal, a tool cutting edge is fastened by means of a retaining mount. When an electric voltage is applied to the piezoelectric crystal, a change in distance between the tool cutting edge and the abutment is imposed by the electrostriction of the crystal, or in other words its elastic deformation in the electric field created by the electric voltage.

In addition, German Unexamined Application DE 4401496 discloses a device for positioning the tool cutting edge according to the preamble of claim 9, for high-precision machining of circular, noncircular and/or noncylindrical inside and/or outside contours, wherein either a tool executes a rotary movement against a workpiece or the workpiece does so against the tool. In this conventional device for positioning the tool cutting edge there is used a piezotranslator, which generates a force in axial direction of a tool shank, this force being transformed via a linkage mechanism disposed between the piezotranslator and the tool cutting edge into a force that acts radially on the tool cutting edge. In this way radial positioning of the tool cutting edge relative to a tool shank is achieved.

When tools with such piezoelectric adjusting mechanisms are used to make cylindrical inside or outside contours, however, it is necessary that the electric field acting on the piezocrystal/piezotranslator be kept constant during operation of the tool, in order thereby to ensure that, once the adjustment of the tool cutting edge has been made, it is maintained throughout the process of cutting with the tool. For this purpose the piezocrystal/piezotranslator must be supplied continuously with electric voltage during operation of the tool. Whereas voltage can be supplied relatively simply to stationary tools, such as a lathe tool, via a plug connection, for example, the voltage supply for tools designed for rotary operation can lead to problems or, because of the fact that cable-less voltage infeed would be necessary for the purpose, can lead to elevated manufacturing costs.

Furthermore, if the adjustment of the tool cutting edge must be kept constant during operation of the tool by continuous injection of voltage into the piezocrystal/piezotranslator, the risk exists that the electric field which acts on the piezocrystal/piezotranslator and which is actually supposed to be constant will be inadvertently changed under the influence of external magnetic or electric interfering fields, which in turn would cause a change in the adjustment of the tool cutting edge. Especially in the case of tools designed for rotary operation, such as boring tools, this risk can be present because of the fact that the piezocrystal/piezotranslator itself is rotating, as is therefore the electric field acting on the piezocrystal/piezotranslator.

The object of the present invention is therefore to provide a piezoelectric adjusting mechanism for tool cutting elements which is capable, without an external voltage supply and without great technical complexity, of reliably maintaining a specified adjustment of the tool cutting elements during operation of the tool.

This object is achieved by the piezoelectric adjusting mechanism according to the features of claim 1. The inventive piezoelectric adjusting mechanism is differentiated from conventional piezoelectric adjusting mechanisms by a retaining mechanism, which ensures that the (first) piezoelectric positioning element, such as a piezocrystal in the form of a round rod, is stabilized by mechanical means in a specified deformation condition. Because of this retaining mechanism, it is ensured that the piezoelectric positioning element cannot revert from its specified deformation condition achieved by the voltage supply back to its initial condition after an interruption of the voltage supply between an external voltage source and the piezoelectric positioning element. Since the specified deformation condition of the piezoelectric positioning element achieved by the voltage supply determines the adjustment of the tool cutting edge by virtue of the connection between the piezoelectric positioning element and the tool cutting edge, a specified adjustment of the tool cutting edge can be achieved by the retaining mechanism independently of a voltage supply and thus regardless of external interfering influences.

In a preferred embodiment, the retaining mechanism comprises a clamping device that substantially completely encloses the piezoelectric positioning element, such as a conventional collar band, whose clamping force is so great that the piezoelectric positioning element is maintained in the specified deformation condition, or in other words remains stabilized and quasi "frozen", as well as a release device, such as a (second) piezoelectric positioning element, in order to permit release of the clamping device and thus elimination of the clamping force exerted by the clamping device on the piezoelectric positioning element. In this embodiment, the positioning elements can advantageously be energized independently of one another electrically, or in other words by means of a uniform open-loop or closed-loop control device, namely one that is electrically operated. This permits a particularly precise adjustment of the tool cutting element.

A particularly simple embodiment of the inventive adjusting mechanism is achieved when the cutting element is securely connected to the first positioning element, by means of a retaining mount or directly. The use of a retaining mount provides the special benefit that the clamping device can grip the entire volume of the piezoelectric positioning element (piezo positioning actor).

The inventive adjusting mechanism is generally applicable for any tool or any form of machining by material removal, such as a lathe, boring, milling or reaming tool, which has a tool shank and at least one cutting element mounted adjustably thereon.

By virtue of a positioning range of up to 100 $\mu$m with a resolution of better than 0.1 $\mu$m and a loadability of more than 500 N, however, the inventive adjusting mechanism is used in particular in precision boring tools or reamers, in which extremely precise adjustment of the cutting element or elements, such as PCD or metal carbide cutting inserts, is needed in view of the high dimensional, shape and positional accuracy, surface quality and surface texture to be achieved for the bore to be machined.

The inventive precision boring tool preferably has two cutting elements disposed diametrally in recesses on the outside circumference of the tool shank. In this case it is particularly advantageous when the (first) piezoelectric positioning element is placed between the two diametrally disposed cutting elements in such a way that it can be connected directly to both cutting elements. Provided the piezoelectric positioning element can be disposed in central position in radial direction relative to the axis of rotation of the precision boring tool, which can be achieved by simple structural features on the tool shank and/or on the piezoelectric positioning element, synchronous adjustment of both cutting elements in radial direction of the tool shank can therefore be achieved by application of an electric voltage to the piezoelectric positioning element and the resulting elastic deformation of the piezoelectric positioning element. In this way the desired adjustment of the cutting elements can be reliably achieved durably by means, for example, of the collar band cited hereinabove, which embraces the (first) piezoelectric positioning element and clamps it securely such that relaxation of its elastic deformation is not possible.

If a conical bore, for example, is to be created by means of the precision boring tool, the inventive adjusting mechanism can be additionally provided with a further (third) piezoelectric positioning element, which in relation to the tool shank is at a distance axially from the first piezoelectric positioning element and can be electrically energized independently thereof. Hereby tapering of the cutting elements can be achieved in simple manner.

The voltage supply of the piezoelectric positioning elements is achieved in simple manner by providing, on the tool shank, a common terminal element which permits independent electrical energization of the positioning elements, or in other words independent infeed of the adjusting voltage and of the release voltage. In order to avoid unbalance during rotary operation of the precision boring tool, the common terminal element preferably has rotationally symmetric structure. For this purpose the common terminal element can comprise, for example, a plurality of slip rings, which are appropriately associated with the respective positioning elements, one of the slip rings being able to function as the common terminal connection. By this configuration, electrical energization of the piezoelectric positioning elements and thereby adjustment of the cutting elements during operation of the tool is made possible even in the case of a precision boring tool designed for rotary operation.

A particularly advantageous embodiment of the voltage supply is achieved when, according to claim 18, a connector part via which energization of the at least one piezoelectric positioning element and of the retaining mechanism takes place is provided on the tool. The connector part can be provided at any appropriate position on the tool shank, although it is preferably formed at a position which is shielded as well as possible from chips, coolant, lubricant or temperature effect during use of the tool.

A particularly advantageous position of the connector part, such as described in claim 19, is achieved, for example, when the tool is equipped with a hollow taper shank, which can be connected via an HSK coupling to a tool carrier part, such as a tool system module or a spindle. Such HSK couplings are becoming used increasingly more frequently as junction points or disconnection points in the embodiment, when it is necessary to group together tools with particularly high stiffness in modular relationship or to couple them to a machine spindle. Examples of such HSK chucking systems are disclosed in German Patents 3807140 C2 or DE 4220873 A1, to the content of which reference is expressly made here.

The relatively large-area pair of radial end faces which is provided in such couplings and via which the parts to be coupled are braced against one another is exploited advantageously in the improvement of claim 19 in order to shield the connector part from external influences. During operation of the tool the connector part either can be deactivated, in which case the connector part is merely sealed on all sides by the pair of radial annular faces, or, via a connector-part mating piece in the tool-carrier part, can be connected continuously to corresponding control leads in the tool-carrier part, such as in a spindle, in which case the rotationally symmetric terminal element is integrated into the tool-carrier part in order to transmit the electric control signals during tool operation.

The inventive adjusting mechanism will now be described on the basis of a preferred practical example with reference to the attached drawings, wherein:

FIG. 1 shows a vertical section in longitudinal direction through a precision boring tool with an inventive piezoelectric adjusting mechanism;

FIG. 2 shows a horizontal section in longitudinal direction through the precision boring tool shown in FIG. 1.

Figure 3:
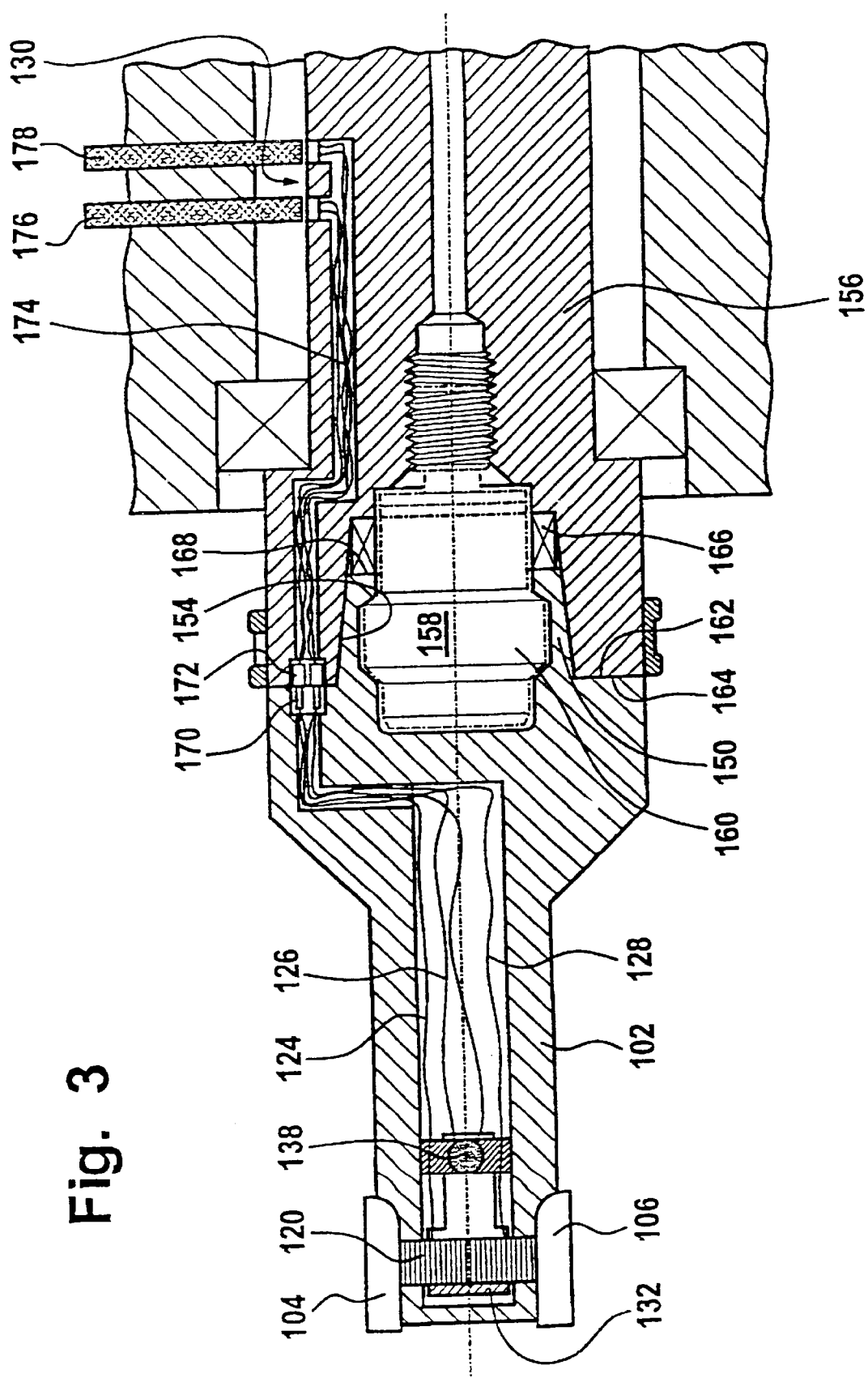
FIG. 3 shows a schematic sectional view of a further embodiment of the tool with a modified type of electrical energization of the piezoelectric adjusting mechanism.

The precision boring tool illustrated only schematically in FIG. 1 has as its essential constituents a tool shank 2, two cutting elements 4, 6 and an inventive piezoelectric adjusting mechanism 8 for adjustment of cutting elements 4, 6 relative to tool shank 2.

Tool shank 2 can be connected in any appropriate way to a machine-tool spindle (not illustrated) or can be a constituent of a modular tool system (also not illustrated). As is evident from FIGS. 1 and 2, a cavity 10, which extends in the direction of the longitudinal axis or axis 3 of rotation of tool shank 2 and which houses the inventive piezoelectric adjusting mechanism 8 is formed in tool shank 2. Furthermore, recesses 16, 18, which are diametrically disposed relative to the longitudinal axis or axis 3 of rotation, and in each of which there is received one of the two cutting elements 4, 6, such as PCD or (metal carbide cutting inserts in radially adjustable and preferably guided relationship, are provided on outside circumference 12 in head portion 14 of tool shank 2.

Piezoelectric adjusting mechanism 8 comprises substantially a first piezoelectric positioning element 20 connected to the two cutting elements 4, 6, a retaining mechanism 22, electric leads 24, 26, 28 and a common terminal element 30.

Cutting elements 4, 6 are secured on first piezoelectric positioning element 20 in conventional manner, such as by means of a retaining mount (not illustrated) or directly. In this practical example, first piezoelectric positioning element 20, such as a piezocrystal of conventional type, has the form of an elongated round rod-like member, which is disposed perpendicular to the longitudinal axis or axis 3 of rotation of tool shank 2 in such a way that it diametrally connects the two cutting elements 4, 6. Although not apparent from FIG. 1 and FIG. 2, first piezoelectric positioning element 20 is disposed in centered position in radial direction relative to the longitudinal axis or axis 3 of rotation of tool shank 2. This can be achieved by simple structural measures on tool shank 2 and/or on piezoelectric positioning element 20.

Retaining mechanism 22 comprises a collar band 32 mechanically embracing first piezoelectric positioning element 20 with two opposite, free-standing end portions 34, 36 disposed with space between them in the clamped condition of collar band 32 as well as a second piezoelectric positioning element 38, such as a piezocrystal that also has the form of a round rod-like member, disposed between the two end portions 34, 36 of collar band 32, the said crystal being oriented, relative to the longitudinal axis or axis 3 of rotation 3 of tool shank 2, such that it is turned by 90° compared with first piezoelectric positioning element 20, as can be seen from FIG. 1 and FIG. 2. In terms of the necessary clamping force, which must be generated by residual stresses in the material of collar band 32, the said collar band 32 is designed such that, once first piezoelectric positioning element 20 has been adjusted, in the manner to be explained hereinafter, it keeps the said element clamped then and during subsequent chip-removing operation in such a way that first piezoelectric positioning element 20 cannot regain its initial resting deformation condition after interruption of its voltage supply, or in other words after disappearance of the electric field acting on the piezoelectric crystal. Collar band 32 can be opened by application of an electric voltage to second piezoelectric positioning element 38 disposed between the two end portions 34, 36 of collar band 32, by the elastic deformation thereof under the effect of the electric field created by the voltage. For this purpose it is naturally necessary that, upon application of an electric voltage, second piezoelectric positioning element 38 generate a force that is larger than the clamping force produced by residual stresses of collar band 32 and exerted by collar band 32 on first piezoelectric positioning element 20. In the released or open condition of collar band 32, a force which acts synchronously on cutting elements 4, 6 in radial direction of tool shank 2 and thus causes a change in spacing between the two cutting elements 4, 6 in radial direction is generated by application of an electric voltage to first piezoelectric positioning element 20. In this way the desired adjustment of cutting elements 4, 6 in radial direction of tool shank 2 can be achieved.

Furthermore, as can be seen in particular from FIG. 1, collar band 32 is substantially matched to first piezoelectric positioning element 20 in such a way that it embraces first piezoelectric positioning element 20 over as much as possible of its entire length, in order to restrict relaxation of the elastic deformation produced by electrical energization to the shortest possible length portions.

Both the first and second piezoelectric positioning elements are characterized by a positioning range of up to 100 $\mu$m with a resolution (smallest possible positioning displacement) of less than 0.1 $\mu$m and a loadability of more than 500 N.

Voltage to the two piezoelectric positioning elements 20, 38 is supplied independently of one another via electric leads 24, 26, 28 disposed in cavity 10 as well as via common terminal element 30, which can be connected to an external voltage source (not illustrated). Electric leads 24, 26, 28 are of course disposed or configured such that no unbalance due to their arrangement is caused during rotary operation of the precision boring tool. This is also true for the common terminal element 30 which, although illustrated as a conventional plug connector in FIG. 1 for reasons of simplicity of the diagram, preferably has rotationally symmetric geometry. For this purpose common terminal element 30 can enclose the slip rings associated with the respective piezoelectric positioning elements 4, 6, the said slip rings being countersunk in annular recesses on the outside circumference of tool shank 2 or disposed as annular members on the outside circumference of tool shank 2 and connected in suitable manner to electric leads 24, 26, 28. Thus independent infeed of the electric voltages necessary for adjustment of cutting elements 4, 6 and for release of collar band 32 is achieved via common terminal element 30.

Retaining mechanism 22 of the inventive adjusting mechanism ensures constant adjustment of cutting elements 4, 6 regardless of whether or not first piezoelectric positioning element 4 is supplied with voltage. In the practical example of the inventive adjustment mechanism shown in FIGS. 1 and 2, it is therefore not necessary, for the purpose of maintaining a specified adjustment of cutting elements 4, 6, to continue the supply of voltage between first piezoelectric positioning element 2 and the external voltage source once an adjustment of cutting elements 4, 6 has been made. Because of the configuration of common terminal element 30 as an arrangement of slip rings, however, it would be possible in general to supply piezoelectric positioning elements 4, 6 with voltage even during rotary operation of the precision boring tool, in order, for example, to make a subsequent correction to the adjustment of cutting elements 4, 6, or else to be able to create noncircular bores by injection of a voltage having a voltage frequency matched to the speed of the precision boring tool.

The functional principle of the inventive adjusting mechanism will now be described in the following. The precision boring tool is first adjusted to the required boring diameter in a special preadjusting fixture (not illustrated). Piezoelectric positioning elements 20, 38 are then electrically energized via common terminal element 30 and electric leads 24, 26, 28. In this process, second piezoelectric positioning element 38 is electrically energized first, in order to release or open collar band 32 by the elastic deformation of second piezoelectric positioning element 38 caused thereby and in this way to permit elastic deformation of first piezoelectric positioning element 4 for the purpose of adjusting cutting elements 4, 6. In the process, first piezoelectric positioning element 4 is energized by a control voltage that is infinitely variable or that can be adjusted in very fine increments, in such a way that cutting elements 4, 6 are adjusted to the specified radial size corresponding to the desired boring diameter of the precision boring tool.

After the desired radial adjustment of cutting elements 4, 6 has been reached, the adjusting voltage applied to first piezoelectric positioning element 20 is continued at first, while the release voltage applied to second piezoelectric positioning element 38 is turned off, whereby collar band 32, in response to the residual stresses generated in collar band 32 during electrical energization of second piezoelectric positioning element 38, clamps first piezoelectric positioning element 20 in such a way that the elastic deformation of first piezoelectric positioning element 20 caused by the adjusting voltage applied to first piezoelectric positioning element 20 is maintained. After the positioning voltage of first piezoelectric positioning element 20 has been turned off, the deformation condition that exists in the length portion of first piezoelectric positioning element 20 gripped by collar band 32 therefore no longer changes from the instant of clamping by collar band 32, whereby the adjustment of cutting elements 4, 6 brought about in this way also no longer changes. The precision boring tool is thus ready for service. As already mentioned hereinabove, electrical energization of the piezoelectric positioning elements would also be conceivable during chip-removing operation, but is not necessary for normal operation of the precision boring tool according to the described practical example.

In an advantageous modification of the inventive adjusting mechanism described hereinabove, the adjusting mechanism can comprise two or more piezoelectric positioning elements disposed spaced apart in the direction of the longitudinal axis or axis of rotation of tool shank 2, whereby tapering of cutting elements 4, 6 and thus a conical bore would be achievable.

Obviously modifications of the illustrated system are possible without deviating from the basic concepts of the invention. As an example which differs from the embodiment according to FIGS. 1 and 2, the two cutting elements 4, 6 can be braced via spacer pieces against piezoelectric positioning element 8, which is still diametrally aligned, in such a way that collar band 32 can grip the entire outer surface of the piezoelectric positioning element, and in doing so can in fact cover the entire spectrum of deformations. Thus the entire volume of piezoelectric positioning element 20 can be stabilized in the predetermined deformation condition.

Instead of the one-piece piezoelectric positioning element 20 of FIGS. 1 and 2, there can also be employed a multi-piece, preferably two-piece element, these piezo positioning elements preferably being surrounded by a common form-stabilizing means, in the form of a clamp 32, for example. The piezo positioning elements can then be braced with their radial inner end against an abutment which is formed in the tool head and which then performs the function of stabilization of the radial position of the piezo positioning elements.

The contacts of terminal element 30 can also be sunk into the tool shank, so that the tool can be received in a conventional chucking shank after the adjustment has been made.

FIG. 3 illustrates an alternative version of an inventive tool, in which the form of the tool shank on the one hand and the voltage supply of the piezoelectric positioning elements on the other hand have been modified. The cutting-edge adjusting mechanism is unchanged, and so it does not have to be described in more detail. Those components of the tool which correspond to the components of the embodiment of the embodiment according to FIGS. 1 and 2 are allocated reference numerals increased by 100.

In this case tool shank 102 has a hollow taper shank 150, which is received in a corresponding mount 154 in a machine spindle 156. HSK chucking cartridge 158, indicated by dot-dash lines, is securely anchored in spindle 156. This chucking cartridge can be configured, for example, in the manner described in our own German Patent Application, DE 19753663 A1.

In such HSK chucking systems, tool shank 102 and spindle 156 are chucked together by the process in which hollow taper shank 150 is pulled sufficiently far into mount 154 by means of a plurality of chucking elements 160 of chucking cartridge 158 that radial annular face 162 of tool shank 102 is brought into flat bearing relationship with a mating support face 164 at the end of spindle 156. At the same time as the tool is being pulled into the mount, at least one driver block 166 is brought into interlocking engagement in a recess 168 at the end face of hollow taper shank 150.

This fixation of angular position is exploited in the embodiment according to FIG. 3 to ensure that the supply to positioning elements 120,138 is particularly free of interference, or in other words is protected from external influences. Current-supply leads 124,126 and 128 in this case are routed to a connector part 170 which, when tool shank 102 has been fixed in angular position relative to spindle 156, is disposed in alignment with and facing a connector mating piece 172. From this connector mating piece 172, control leads 174 run to a terminal region 130, at which the control signals can be injected from a control unit (not illustrated) via contacts 176, 178. This can be accomplished during rotation of the tool by interposed slip rings and/or brushes, or while the spindle is stationary by the fact that contacts 176, 178 for the adjustment process are brought into contact with the terminal region. Since radial annular faces 160, 162 are pressed flat against one another in the coupled condition of the tool, connector parts 170, 172 and thus supply leads 124, 126, 128 are well shielded from the surroundings.

Obviously variations of this embodiment also are possible without deviating from the concepts of the invention. For example, connector parts 170, 172 and/or the terminals in region 130 can be distributed with equal spacing over the circumference, so that unbalances can be largely avoided.

The channel for control leads 174 in spindle 156 can also be dispensed with in its entirety. The tool cutting edges are then adjusted by inserting the tool in a separate adjusting fixture, in which mating piece 172 of the connector and the terminal for the electric control unit are provided.

Furthermore, a different work system module such as a shank extension can be provided instead of machine spindle 165.

The present invention therefore relates in general to a piezoelectric adjusting mechanism for adjusting a cutting element mounted adjustably on a tool shank of a tool, the said mechanism comprising a first piezoelectric positioning element, connected to the cutting element, for positioning the cutting element relative to the tool shank, as well as a retaining mechanism for retaining the first positioning element in a specified deformation condition. The inventive piezoelectric adjusting mechanism is applicable in particular for a precision boring tool for adjustment, in radial direction of the precision boring tool, of cutting elements disposed on the outside circumference of the precision boring tool.

What is claimed is:

1. An adjusting mechanism for adjusting a cutting element mounted adjustably on a tool shank of a tool, comprising a first piezoelectric positioning element, in connection with the cutting element, for positioning the cutting element relative to the tool shank, and a retaining mechanism for retaining the first positioning element in a specified deformation condition.

2. An adjusting mechanism according to claim 1, wherein the retaining mechanism comprises a clamping device, that encloses the first piezoelectric positioning element, for clamping the first piezoelectric positioning element, as well as a release device for release of the clamping device.

3. An adjusting mechanism according to claim 2, wherein the release device comprises a second piezoelectric positioning element.

4. An adjusting mechanism according to claim 3, wherein the positioning elements can be electrically energized independently of one another.

5. An adjusting mechanism according to claim 4, further comprising a common terminal element on the tool shank for supplying electrical voltage to the positioning elements.

6. An adjusting mechanism according to claim 1, wherein the cutting element is connected directly to the first positioning element.

7. A tool for machining by material removal, comprising a tool shank, a cutting element mounted adjustably on the tool shank, and an adjusting mechanism according to claim 1.

8. A tool according to claim 7, further comprising a plurality of cutting elements connected to the first positioning element.

9. A tool according to claim 7, wherein the tool is designed for rotary operation.

10. A precision boring tool comprising a tool shank, a cutting element mounted adjustably on the tool shank, an adjusting mechanism, which is received in the tool shank, connected to the cutting element and provided with a first piezoelectric positioning element for positioning the cutting element in the radial direction of the tool shank, and a retaining mechanism for retaining the first positioning element in a specified deformation condition.

11. A precision boring tool according to claim 10, further comprising two cutting elements disposed diametrally in corresponding recesses on an outside circumference of the tool shank, the first positioning element being disposed between the two cutting elements.

12. A precision boring tool according to claim 10, wherein the first positioning element is connected directly to both cutting elements.

13. A precision boring tool according to claim 10, wherein the retaining mechanism comprises a collar band that substantially completely encloses the first positioning element.

14. A precision boring tool according to claim 13, wherein the retaining mechanism comprises a second piezoelectric positioning element disposed between two opposite freestanding end portions of the collar band for release of the collar band.

15. A precision boring tool according to claim 14, wherein the first and second positioning elements can be electrically energized independently of one another.

16. A precision boring tool according to claim 1, wherein the adjusting mechanism comprises a third piezoelectric positioning element, which is spaced axially apart from the first positioning element relative to the tool shank and which can be electrically energized independently of the said first positioning element.

17. A precision boring tool according to claim 1, further comprising a common terminal element, which is provided, for example, on the tool shank and which is preferably rotationally symmetric, for independent electrical energization of at least one of the positioning elements and of the retaining mechanism.

18. A precision boring tool according to claim 1, further comprising a connector part for connection of electric control leads for at least one of the positioning elements or for the retaining mechanism.

19. A precision boring tool according to claim 18, wherein the tool shank carries a hollow taper shank, which merges into a radial annular face, with which the tool can be chucked by an HSK coupling against a chucking face of the tool-carrier part, and wherein the connector part is disposed in the radial annular face.

20. A precision boring tool according to claim 17, wherein the common terminal element comprises at least one of the positioning elements and slip rings associated with the retaining mechanism.

21. A precision boring tool according to claim 1, wherein the piezoelectric positioning elements have a positioning range of up to 100 $\mu$m with a resolution of better than 0.1 $\mu$m and a loadability of more than 500 N.

* * * * *